US010333819B2

(12) United States Patent
Chow et al.

(10) Patent No.: US 10,333,819 B2
(45) Date of Patent: *Jun. 25, 2019

(54) SYSTEMS AND METHODS FOR JOINTLY OPTIMIZING WAN AND LAN NETWORK COMMUNICATIONS

(71) Applicant: ASSIA SPE, LLC, Wilmington, DE (US)

(72) Inventors: Peter Chow, Los Altos, CA (US); Wonjong Rhee, San Francisco, CA (US); Ardavan Maleki Tehrani, Atherton, CA (US); Marc Goldburg, Redwood City, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/182,513

(22) Filed: Jun. 14, 2016

(65) Prior Publication Data

US 2016/0294669 A1    Oct. 6, 2016

Related U.S. Application Data

(63) Continuation of application No. 13/995,900, filed as application No. PCT/US2011/021003 on Jan. 12, 2011, now Pat. No. 9,369,370.

(51) Int. Cl.
*H04L 12/24* (2006.01)
*H04L 12/26* (2006.01)

(52) U.S. Cl.
CPC ............ *H04L 43/50* (2013.01); *H04L 41/083* (2013.01); *H04L 41/0896* (2013.01);
(Continued)

(58) Field of Classification Search
None
See application file for complete search history.

(56) References Cited

U.S. PATENT DOCUMENTS

| 6,785,279 B1 | 8/2004 | Crooks | |
| 2001/0047406 A1* | 11/2001 | Araujo | H04L 29/06 709/223 |

(Continued)

FOREIGN PATENT DOCUMENTS

| CN | 101461253 | 6/2006 |
| CN | 101690079 | 3/2010 |

(Continued)

OTHER PUBLICATIONS

Berstein, Jeff, et al., "CPE WAN Management Protocol", Technical Report, Forum TR-069, May 1, 2004, 109 pages.

(Continued)

*Primary Examiner* — Duc T Duong
(74) *Attorney, Agent, or Firm* — North Weber and Baugh LLP

(57) ABSTRACT

Described are systems and methods for jointly optimizing Wide Area Network (WAN) and Local Area Network (LAN) network communications. In one embodiment, a management device communicatively interfaced with a WAN and a LAN includes a collection module to collect LAN information from the LAN and WAN information from the WAN; an analysis module to jointly analyze the collected WAN information and the collected LAN information to identify an operational condition; and an implementation module to initiate a management event responsive to the operational condition being identified. In one embodiment, the management event includes generating and transmitting a diagnostics report responsive to a fault being identified. The man- (Continued)

agement device may further generate and execute instructions to remedy the diagnosed fault.

20 Claims, 9 Drawing Sheets

(52) U.S. Cl.
CPC .......... *H04L 41/26* (2013.01); *H04L 43/0829* (2013.01); *H04L 43/0888* (2013.01); *H04L 43/16* (2013.01); *Y04S 40/162* (2013.01); *Y04S 40/168* (2013.01)

(56) References Cited

U.S. PATENT DOCUMENTS

| | | | |
|---|---|---|---|
| 2002/0198952 A1* | 12/2002 | Bell | H04L 12/2801 709/208 |
| 2003/0039240 A1* | 2/2003 | Sutanto | H04L 12/2801 370/352 |
| 2003/0145082 A1 | 7/2003 | Son | |
| 2006/0126613 A1 | 6/2006 | Zweig | |
| 2006/0164978 A1* | 7/2006 | Werner | H04L 41/0896 370/229 |
| 2006/0218267 A1* | 9/2006 | Khan | H04L 12/24 709/224 |
| 2006/0259583 A1 | 11/2006 | Matsuura | |
| 2008/0219168 A1* | 9/2008 | Enomoto | H04L 45/04 370/237 |
| 2009/0028181 A1 | 1/2009 | Shimon | |
| 2012/0053901 A1* | 3/2012 | Arefeen | G05B 23/0213 702/183 |
| 2015/0230275 A1* | 8/2015 | Kerpez | H04L 12/66 370/329 |
| 2017/0111105 A1* | 4/2017 | Ling | H04B 7/18515 |

FOREIGN PATENT DOCUMENTS

| | | |
|---|---|---|
| CN | 101815000 | 8/2010 |
| JP | 2000020428 | 1/2000 |
| JP | 2009540671 | 11/2009 |
| WO | 2007146048 | 12/2007 |
| WO | 2007146048 A2 | 12/2007 |

OTHER PUBLICATIONS

Final Office action for Japanese Patent Application No. 2013-549393, dated Mar. 3, 2015.
First Office Action for Chinese Patent Application No. 201180064927.6.
International Preliminary Report on Patentability for International Patent Application No. PCT/US2011/021003, dated Jul. 16, 2013, 12 pages.
International Search Report and Written Opinion for International Patent Application No. PCT/US2011/021003, dated May 13, 2011, 15 pages.
Non Final Office Action for Japanese Patent Application No. 2013-549393, dated Aug. 5, 2014, 5 pages.
Notice of Allowance for Japanese Patent Application 2013-549393, dated Oct. 1, 2015.
Notice of Allowance for U.S. Appl. No. 13/995,900 dated Jan. 29, 2016, 7 pages.
Office action for Canadian Patent Application No. 2,823,295, dated Nov. 13, 2016.
Office Action dated Sep. 22, 2016, in Candian Patent Application No. 2,823,295 (3pgs).
Office Action dated Jun. 21, 2017, in Canadian Patent Application No. 2,823,295 (5pgs).
Office Action dated Nov. 1, 2017, in Australian Patent Application No. 2016222368 (3pgs).
Office Action dated Jun. 28, 2018 in Indian Patent Application No. 4985CHENP2013 (7pgs).
Office Action dated Jul. 4, 2018, in Canadian Patent Application No. 2,823,295 (3pgs).

* cited by examiner

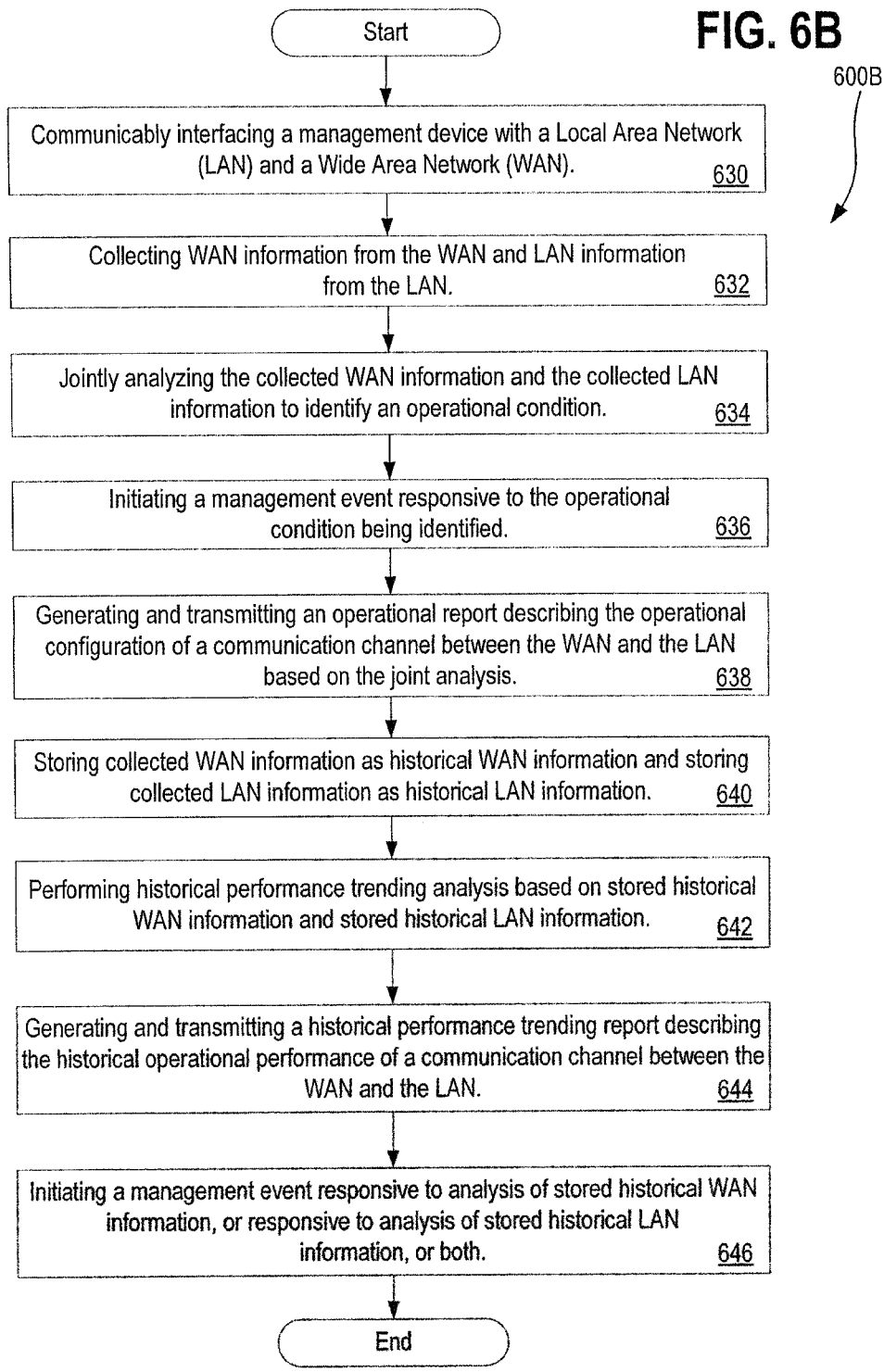

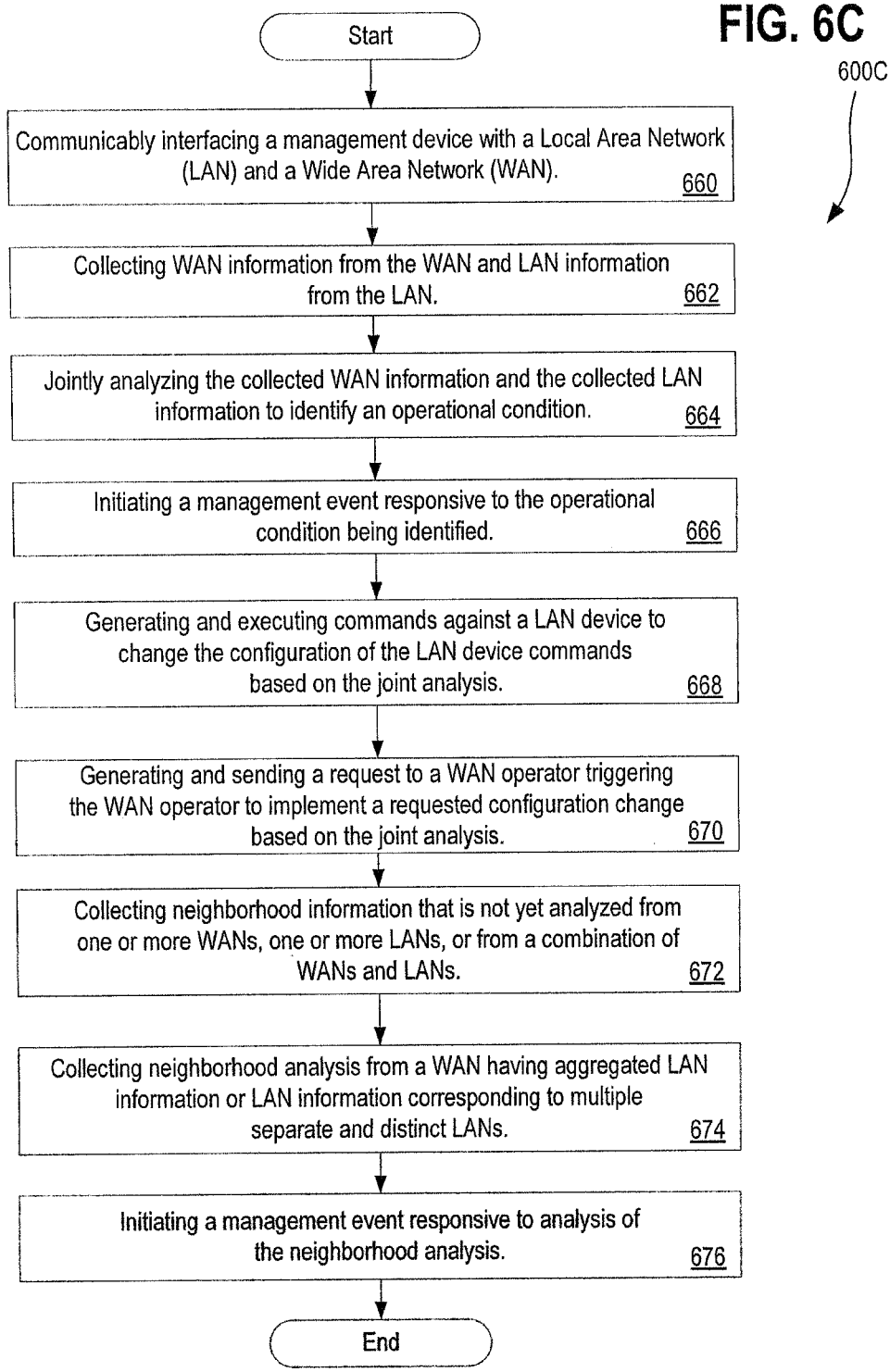

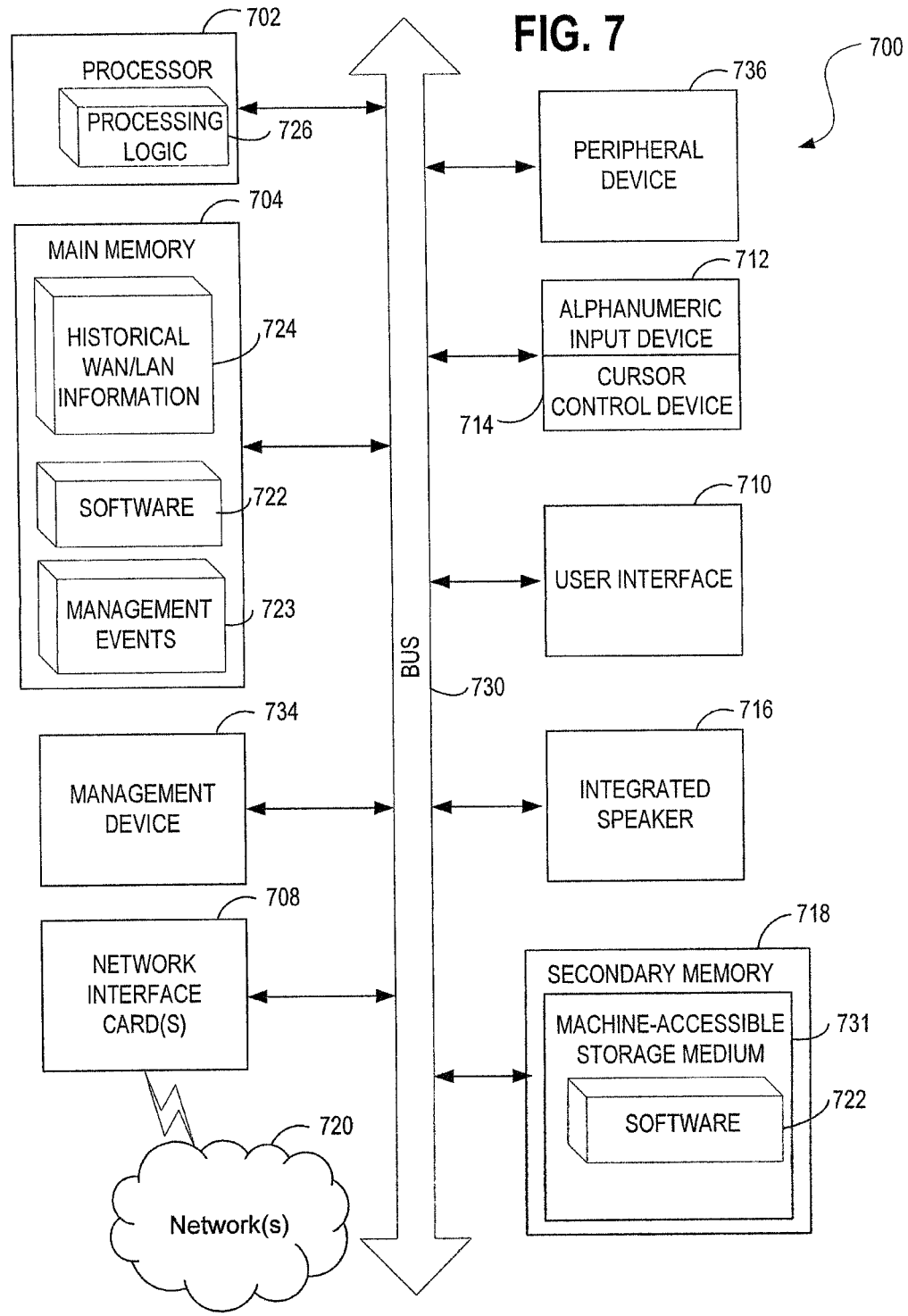

US 10,333,819 B2

SYSTEMS AND METHODS FOR JOINTLY OPTIMIZING WAN AND LAN NETWORK COMMUNICATIONS

CLAIM FOR PRIORITY

This application is a continuation of U.S. patent application Ser. No. 13/995,900, filed on 8 Jul. 2014, titled "SYSTEMS AND METHODS FOR JOINTLY OPTIMIZING WAN AND LAN NETWORK COMMUNICATIONS," which claims priority to PCT Patent Application Serial No. PCT/US2011/021003, filed on 12 Jan. 2011, titled "SYSTEMS AND METHODS FOR JOINTLY OPTIMIZING WAN AND LAN NETWORK COMMUNICATIONS," both of which are incorporated herein by reference in their entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for jointly optimizing WAN and LAN network communications.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

A Wide Area Network (WAN) provides interconnectivity amongst many diverse networks. The "Internet" is a Wide Area Network that joins together many other networks, providing a communications path between devices operating within distinct and often geographically dispersed networks. A Local Area Network (LAN) enables multiple distinct devices within an end-user's premises to communicate amongst themselves locally. An end-user's LAN is often connected to the Internet via a WAN back-haul connection to an Internet Service Provider (ISP) that provides the end-user consumer with Internet connectivity and Internet Bandwidth. Devices within the end-user's LAN may communicate with devices external to the LAN over the WAN back-haul connection provided by the end-user's ISP.

Traditionally, the WAN is controlled, managed and maintained by service providers, such as Internet Service Providers, Telecommunications Operators, etc. Conversely, a LAN is typically managed and maintained at a customer's premises by end users/customers, which may be residential users or commercial/business customers. Moreover, operators and service providers typically refrain from addressing any LAN related problems, notwithstanding the fact that, at times, some problems and issues exhibited via the LAN may be related to WAN configurations and settings. Correspondingly, some problems and issues exhibited via the WAN may be related to configurations, settings or problems on the LAN side. Furthermore, the WAN might be operated by a reseller, which does not have access to all management functionalities (such as monitoring, provisioning, control) to which the owner or the wholesaler of the WAN system may have access. Access to such functionalities may be achieved by the embodiments described herein. Moreover, the means of control, monitoring and provisioning, as well as control channels on the two networks, WAN and LAN, are typically distinct and separate, even when the WAN and the LAN are interconnected.

The present state of the art may benefit from systems and methods for jointly monitoring, provisioning and optimizing WAN and LAN network communications which are described herein.

BRIEF DESCRIPTION OF THE DRAWINGS

Embodiments are illustrated by way of example, and not by way of limitation, and can be more fully understood with reference to the following detailed description when considered in connection with the figures in which:

FIGS. 6A, 6B, and 6C are flow diagrams illustrating methods for jointly optimizing WAN and LAN network communications in accordance with described embodiments; and FIG. 7 illustrates a diagrammatic representation of a machine in the exemplary form of a computer system, in accordance with one embodiment.

DETAILED DESCRIPTION

Figure 1:
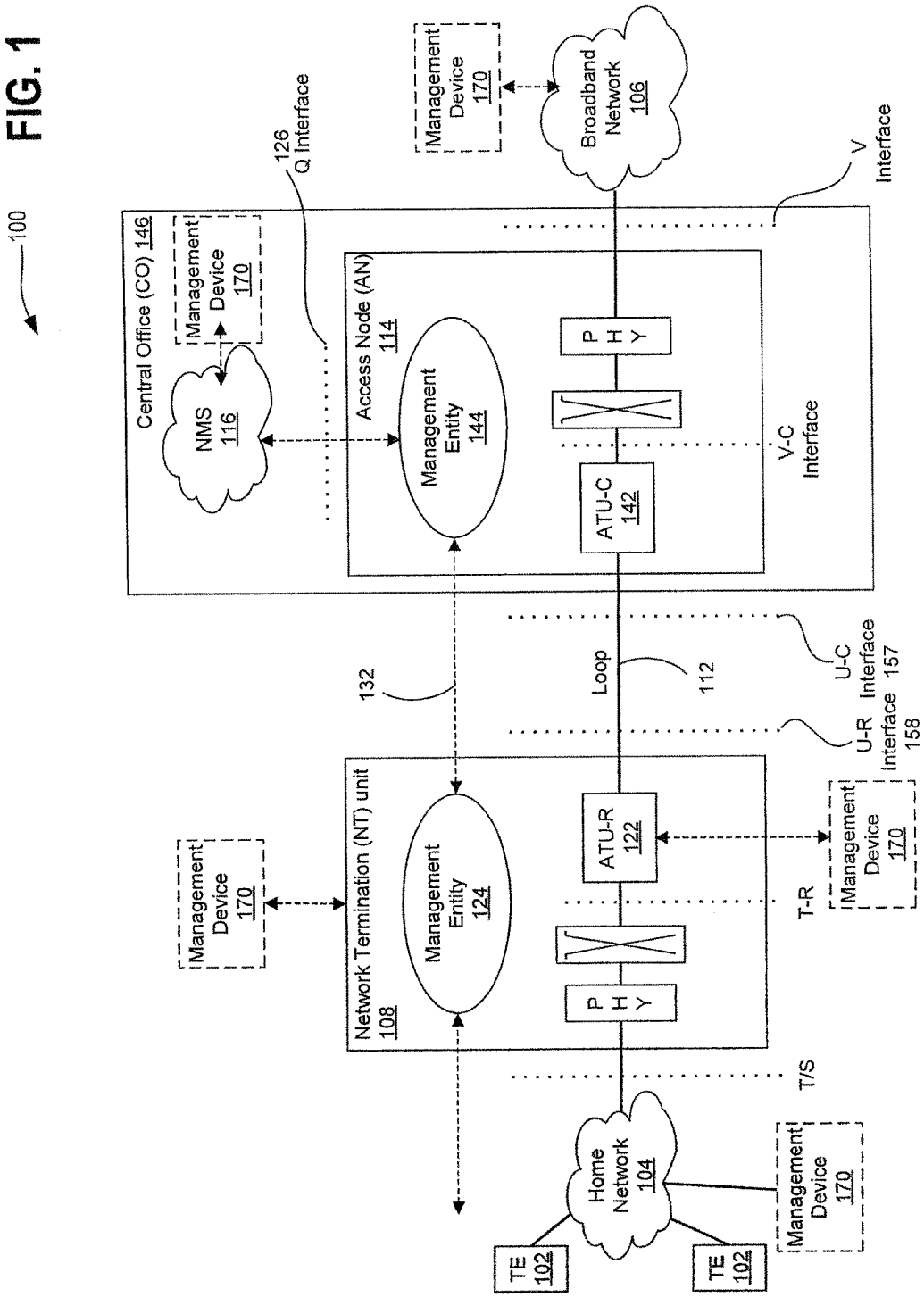
FIG. 1 illustrates an exemplary architecture in which embodiments may operate.

Described herein are systems and methods for jointly optimizing WAN and LAN network communications. In accordance with embodiments described herein, end-user consumers, including residential consumers and business consumers, may connect to the Internet by way of a Wide Area Network (WAN) back-haul connection to an Internet Service Provider (ISP). Such Internet Service Providers may include a Digital Subscriber Line (DSL) internet service provider which provides its subscribing end-users with Internet bandwidth at least partially over copper twisted pair telephone lines, such as that conventionally utilized to carry analog telephone service (e.g., Plain Old Telephone Service (POTS); a coaxial cable internet service provider which provides end-users with Internet bandwidth at least partially over coaxial cable, such as that conventionally utilized to carry "cable" television signals; or a fiber optics internet service provider which provides end-users with Internet bandwidth at over fiber optic cable that terminates at a customer's premises. Other variants exist as well, such as ISPs that provide Internet bandwidth as an analog signal over an analog telephone based connection, ISPs that provide Internet bandwidth over a one-way or two-way satellite connection, and ISPs that provide Internet bandwidth at least partially over power lines, such as power lines conventionally utilized to transmit utility power (e.g., electricity) to an end-user's premises, or ISPs that provide Internet bandwidth at least partially over wireless channels, such as WiFi connectivity at hotspots, or mobile data connectivity via technologies and standards such as WiMax, 3G/4G, LTE, etc.

At an end-user's premises, Internet bandwidth provided via a WAN back-haul connection to an ISP is commonly distributed amongst multiple devices within the end-user's premises via a Local Area Network (LAN), which may be established via a LAN device. Distribution of the Internet Bandwidth provided via the WAN back-haul may further extend to an area around an end-user's premises, such as to an area outside a home, to a space or area outside of or around a business in which the Internet Bandwidth is accessible via the end-user's LAN wirelessly. At the end-user's premises, network traffic may be distributed within the LAN via wired connections or wireless connections, for example, over coaxial wiring, electrical wiring, twisted-pair telephone wiring, variants of Ethernet/Category-5 type wiring, and various types of wireless radio signals using licensed and unlicensed spectrum and various protocols.

Some network traffic associated with the end-user's premises remains local to the LAN, while other traffic destined for locations external to the LAN traverse the LAN onto the WAN interface and onto the Internet via the WAN backhaul.

Besides network traffic traversing the WAN and LAN networks and interfaces, various types of information are available, retrievable, or observable from each of the distinct WAN and LAN networks. The management device described herein collects information collected from the WAN and LAN networks via respective WAN and LAN interfaces to such networks, jointly analyzes the collected WAN information and the collected LAN information to identify an operational condition, and initiates a management event responsive to the operational condition being identified. For example, in some embodiments, the operational condition identified corresponds to a fault within the LAN which is identified based at least in part on the collected WAN information or alternatively, a fault within the WAN which is identified based at least in part on the collected LAN information. In some embodiments, the management event initiated responsive to the operational condition being identified may include generating and transmitting a diagnostic report, conducting additional diagnostics and/or analysis, issuing probes to trigger the output and collection of output from connected devices, such as a LAN device, WAN device, or a network element connected with the management device. In some embodiments, the management device generates and implements instructions responsive to the operational condition being identified, such as corrective actions to remedy a fault or instructions to trigger the adoption of a new device configuration. Network elements and networked devices may include one or more devices such as network gateways, DSL/CPE modems, Cable modems, WAN/LAN gateways, ONT devices, or any other network device which is communicatively interfaced with the WAN or LAN.

Using the systems and methodologies described herein, a management device having access and authority to collect information from a WAN connected network and also a LAN connected network is capable of collecting and jointly analyzing information from the WAN and LAN networks to jointly optimize WAN and LAN network communications.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a Management Device to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate in compliance with the G.997.1 standard (also known as G.ploam). Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+ (G.992.5) and the G.993.x emerging Very-high-speed Digital Subscriber Line or Very high-bitrate Digital Subscriber Line (VDSL) standards, as well as the G.991.1 and G.991.2 Single-Pair High-speed Digital Subscriber Line (SHDSL) standards, all with and without bonding.

The G.997.1 standard specifies the physical layer management for ADSL transmission systems based on the clear, Embedded Operation Channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data (which includes performance data) that is available at an Access Node (AN).

In FIG. 1, users terminal equipment 102 (e.g., a Customer Premises Equipment (CPE) device or a remote terminal device) is coupled to a home network 104, which in turn is coupled to a Network Termination (NT) Unit 108. ADSL Transceiver Units (ATU) are further depicted (e.g., a device that provides ADSL modulation of a DSL loop or line). In one embodiment, NT unit 108 includes an ATU-R (ATU Remote), 122 (for example, a transceiver defined by one of the ADSL standards) or any other suitable network termination modem, transceiver or other communication unit. NT unit 108 also includes a Management Entity (ME) 124. Management Entity 124 can be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1 being a long-established command language used to program responses and commands between telecommunication network elements. In one embodiment, Network Termination Unit 108 is communicably interfaced with a management device 170 as described herein. In another embodiment, ATU-R 122 is communicably interfaced with management device 170.

Each ATU-R 122 in a system may be coupled with an ATU-C (ATU Central) in a Central Office (CO) or other central location. ATU-C 142 is located at an Access Node (AN) 114 in Central Office 146. A Management Entity 144 likewise maintains an MIB of operational data pertaining to ATU-C 142. The Access Node 114 may be coupled to a broadband network 106 or other network, as will be appreciated by those skilled in the art. ATU-R 122 and ATU-C 142 are coupled together by a loop 112, which in the case of ADSL may be a twisted pair line, such as a telephone line, which may carry other communication services besides DSL based communications. Either management entity 124 or management entity 144 may implement and incorporate a management device 170 as described herein. Management entity 124 or management entity 144 may further store collected WAN information and collected LAN information within an associated MIB.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from ATU-C 142, while far-end parameters from ATU-R 122 may be derived by either of two interfaces over the UA interface. Indicator bits and EOC messages may be sent using embedded channel 132 and provided at the Physical Medium Dependent (PMD) layer, and may be used to generate the required ATU-R 122 parameters in ME 144. Alternately, the operations, Administration and Maintenance (OAM) channel and a suitable protocol may be used to retrieve the parameters from ATU-R 122 when requested by Management Entity 144. Similarly, the far-end parameters from ATU-C 142 may be derived by either of two interfaces over the U-interface. Indicator bits and EOC message provided at the PMD layer may be used to generate the required ATU-C 142 parameters in Management Entity 124 of NT unit 108. Alternately, the OAM channel and a suitable protocol may be used to retrieve the parameters from ATU-C 142 when requested by Management Entity 124.

At the U interface (also referred to as loop 112), there are two management interfaces, one at ATU-C 142 (the U-C interface 157) and one at ATU-R 122 (the U-R interface 158). Interface 157 provides ATU-C near-end parameters for ATU-R 122 to retrieve over the U interface/loop 112. Similarly, U-R interface 158 provides ATU-R near-end parameters for ATU-C 142 to retrieve over the U interface/loop 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, ATU-C and ATU-R pairs may use it for transporting physical layer OAM messages. Thus, the ATU transceivers 122 and 142 of such a system share various operational data maintained in their respective MIBs.

Depicted within FIG. 1 is management device 170 operating at various locations in accordance with several alternative embodiments. For example, management device 170 is located within home network 104, such as within a LAN. In an alternative embodiment, management device 170 is located at central office 146 and interfaced to home network 104 (e.g., a LAN) and broadband network 106 (e.g., a WAN) via NMS 116. In yet another embodiment, management device 170 operates on the broadband network 106 (e.g., on the WAN or Internet).

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/ Very high-bit-rate DSL (VDSL). Such DSL technologies are commonly implemented in accordance with an applicable standard such as, for example, the International Telecommunications Union (I.T.U.) standard G.992.1 (a.k.a. G.dmt)

for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," "connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

Figure 2:
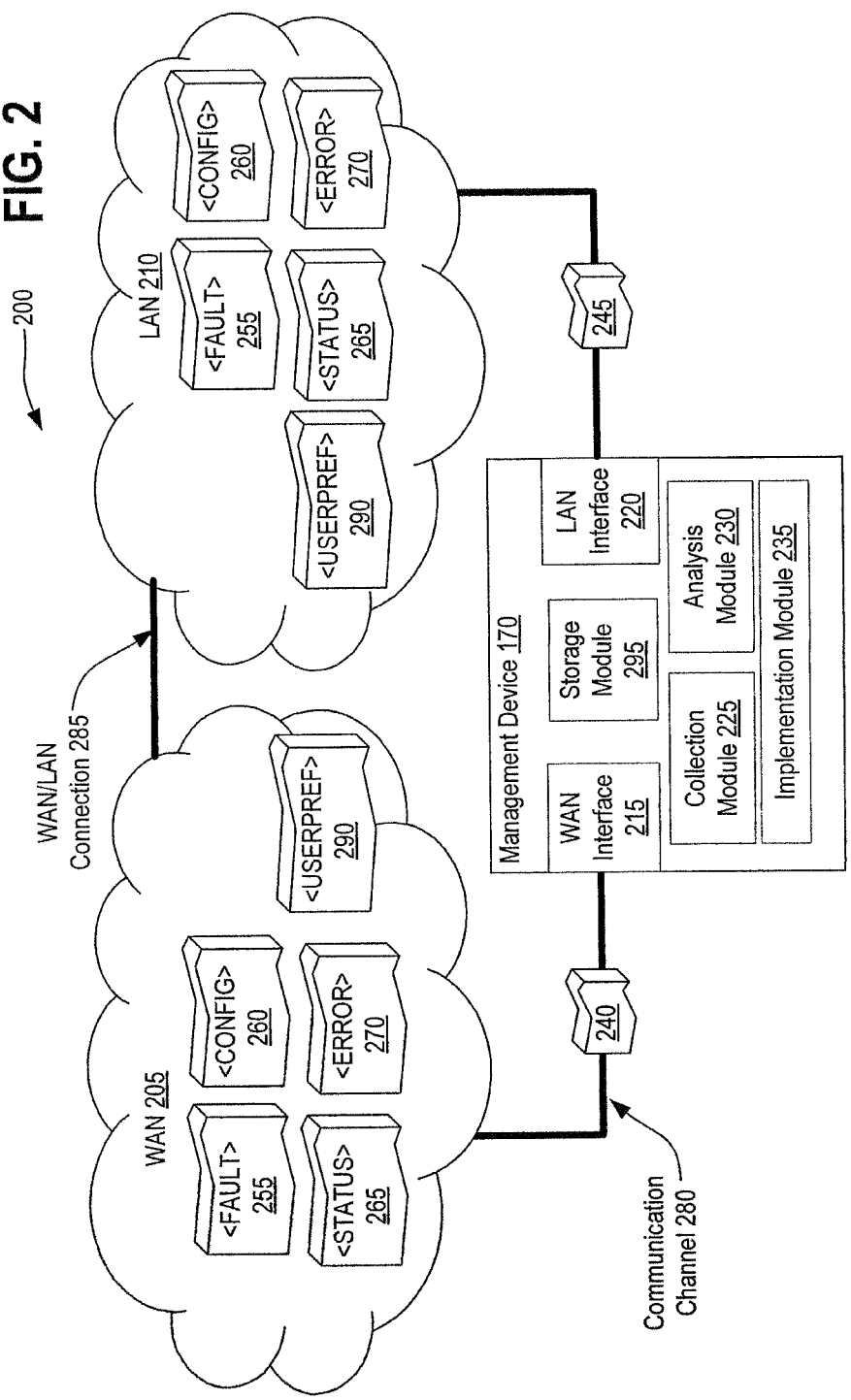
FIG. 2 illustrates an alternative exemplary architecture in which embodiments may operate.

FIG. 2 illustrates an alternative exemplary architecture 200 in which embodiments may operate. Architecture 200 depicts a Wide Area Network (WAN) 205 and Local Area Network (LAN) 210, each communicatively interfaced with management device 170. WAN 205 and LAN 210 are also communicatively interfaced with each other directly via WAN/LAN connection 285, over which data may be communicated between WAN 205 and LAN 210 without having to engage or otherwise communicate with management device 170. For example, management device 170 may carry out WAN/LAN optimizations and communicate with various networked devices in the WAN or in the LAN or both, without serving as an interfacing gateway or as the sole communication link between the LAN and the WAN.

In accordance with one embodiment, management device 170 includes a Wide Area Network (WAN) interface 215 to communicably interface the management device 170 with the WAN 205 and a Local Area Network (LAN) interface 220 to communicably interface the management device 170 with the LAN 210. In one embodiment, management device 170 further includes a collection module 225 to collect LAN information 245 from the LAN 210 and to further collect WAN information 240 from the WAN 205.

In one embodiment, management device 170 includes an analysis module 230 to jointly analyze the collected WAN information 240 and the collected LAN information 245 to identify an operational condition. In one embodiment, management device 170 further includes an implementation module 235 to initiate a management event responsive to the operational condition being identified.

In accordance with various embodiments, the operational condition identified based on the collected WAN information 240 and the collected LAN information 245 may represent a variety of observable, detectable, or determinable operational conditions associated with the LAN 210, associated with the WAN 205, associated with the devices within either the WAN or the LAN, or associated with the communication channel 280 related to the WAN and the LAN.

For example, FIG. 2 depicts various types of information that may be collected from the WAN and/or the LAN. In accordance with certain embodiments, the collected WAN information 240 and/or the collected LAN information 245 may include faults or fault codes 255, configuration information 260, status information 265, and error information 270. The collected information (240 or 245) may take the form of codes, statistics, counters, message strings, and so forth. Other information types or sources of collected WAN and/or LAN information include operational data; active configuration settings of the management device; active configuration settings of networked devices operating within the LAN; active configuration settings of WAN network elements communicatively interfaced with the management device; performance measurements, counters, and/or statistics; and diagnostic information.

WAN and or LAN information to be analyzed may further include historical margin performance of a WAN backhaul; historical performance data relating to a WAN modem; WAN modem retrain counts; WAN modem training data; WAN error metrics; LAN error metrics; WAN packet counts; LAN packet counts; LAN device resets; LAN transmit power levels; LAN transmit spectrums bands; LAN wireless transmission channels; LAN auto-select radio channels; LAN device Identifier; and LAN data collision counts.

Such information, data, and counters may correspond to a current configuration or status, or may instead correspond to historical data collected over a period of time. Thus, in accordance with one embodiment, the information analyzed to identify the operational condition includes historical WAN information or historical LAN information, or both. In accordance with one embodiment, historical WAN information and/or historical LAN information are stored within a storage module 295 of the management device 170. In one embodiment, the analysis module 230 analyzes current WAN information 240, current LAN information 245, historical WAN information, and historical LAN information in the process of identifying the operational condition.

In one embodiment, an analysis module 230 performs historical performance trending analysis based on the historical WAN information and the historical LAN information. In such an embodiment, implementation module 235 generates and transmits a historical performance trending report describing the historical operational performance of a communication channel 280 related to the WAN 205 and the LAN 210. In alternative embodiments, the historical performance trending reports describes the historical performance of a LAN device or the historical performance of a WAN device. For example, such a historical performance trending report may describe the volume of data, average data rates, and traffic class for a computer operating within the LAN over a specified time period. Such information may be of interest to a business consumer reviewing its data usage and costs. Such information may be based on data collected from the WAN but provide LAN specific metrics. Similarly, information collected from the LAN may be utilized to provide WAN specific metrics or WAN based trending. For example, errors, retrains, failed connection requests, failed DNS (domain naming service) requests, and similar metrics available from the LAN may be utilized to provide quality trending metrics of the WAN based connectivity and traffic. Although failures may be exhibited and available from the LAN, many such failures may nevertheless be attributable to operational conditions (e.g., configurations, faults, congestion, etc.) within the WAN 205.

In one embodiment, the collection module collects or estimates one or more user preferences. For example, the one or more user preferences may be determinable based on user preference information 290 collected from the WAN or the LAN. In such an embodiment, the analysis module 230 analyzes the one or more user preferences and the implementation module 235 responsively initiates a management event. For example, implementation module 235 may generate instructions to change the operational condition based at least in part on the one or more user preferences. Changing the operational condition may constitute modifying a configuration of a LAN device or a WAN device based on the user preferences, or requesting a WAN operator to alter the configuration of a communication channel 280 related to the WAN and the LAN.

The management device may collect information from various information sources within the WAN and/or LAN. For example, in one embodiment, a collection module 225 of the management device 170 collects information from one or more sources including: a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base-station; a wireless WiFi compatible base-station; a wireless mobile device repeater; a wireless mobile device base-station; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In some embodiments, the operational condition identified based on the collected WAN information 240 and the collected LAN information 245 may represent a fault diagnosed within the WAN 205 based on the collected LAN information 245 or a fault diagnosed within the LAN 210 based on the collected WAN information 240. In such an embodiment, the implementation module 235 initiating a management event responsive to the operational condition being identified includes the implementation module to generate, provide or transmit a diagnostic report and/or information identifying the fault diagnosed within the WAN or the fault diagnosed within the LAN. Such information may be accessed or provided via the Internet, a webpage, a Graphic User Interface (GUI), or any other suitable communication means similar to the means used by the management device 170 to access information.

For example, a diagnostics report may be generated and sent to a WAN operator, such a DSL or Cable internet service provider. Similarly, a diagnostics report and/or information may be generated, provided or sent to an end-user; accessible or provided via the Internet, a webpage, a Graphic User Interface (GUI), etc. An end-user may benefit from a diagnostic report indicating that a device operating within the end-user's LAN is triggering a large number of malformed packets, such as packets with undeliverable destination addresses. In such an example, the WAN information 240 collected may include counter or statistics information for malformed network traffic packets attributable to a device operating within LAN 210. Subsequent to analyzing the information collected from the WAN and the LAN, implementation module 235 may then generate a diagnostics report, provide or transmit the report to an end-user associated with LAN 210, thus alerting the end-user to the problem. Such a report may similarly be of interest to an operator of the WAN 205, notwithstanding the fact that the fault is attributable to a device operating upon LAN 210. For example, the WAN operator may undertake to filter or block the malformed network traffic, or assist its consumer in identifying and rectifying the source of the malformed packets within the consumer's LAN so as to improve overall network efficiency.

In one embodiment, the implementation module 235 initiating the management event responsive to the operational condition being identified includes the implementation module 235 to generate instructions to remedy a fault diagnosed within the WAN or to generate instructions to remedy a fault diagnosed within the LAN based on the joint analysis, or both. For example, in one embodiment, initiating the management event responsive to the operational condition being identified comprises the implementation module to alter one or more of the following: Forward Error Correction (FEC) parameters, a DSL transmission rate, implement a higher INP (Impulse Noise Protection) parameter setting, a higher margin parameter setting, and/or higher power parameter settings.

In accordance with various embodiments, the operational condition identified based on the joint analysis may include one or more of: network congestion within the WAN; network congestion within the LAN; excess power consumption by communication elements within the LAN; excess power consumption by communication elements within the WAN; bandwidth utilization of the WAN in excess of a maximum threshold; bandwidth availability of the WAN below a minimum threshold; a security breach within the LAN which is determined by observing anomalies in data traffic; a network intrusion within the LAN; a fault on the WAN or the LAN; errors on the WAN or the LAN connection; usage patterns of the WAN or the LAN resources (e.g., bandwidth, power, etc.); bandwidth utilization on the WAN or the LAN; performance measures on the WAN or the LAN; and quality of the WAN or LAN connection, such as level of stability, rate sustainability, etc.

In some embodiments, the identified operational condition represents a configuration, such as an operational configuration of a communication channel 280 related to the WAN and the LAN based on the collected LAN information and the collected WAN information. In one embodiment, the implementation module 235 initiating the management event responsive to the operational condition being identified includes the implementation module 235 to generate and transmit an operational report describing the operational configuration of the communication channel 280 related to the WAN and the LAN. Such a configuration may describe the spectrum over which transceivers within the WAN and/or LAN are communicating, error correction policies or settings, latency policies or settings, data transfer speeds, transmit power levels, and so forth. Such an operational report may enable an end user to optimize LAN configuration settings based on complementary WAN settings, enable a WAN operator to optimize its WAN settings based on complementary LAN settings, or both. Identification of an operational condition need not necessarily correlate to a problem or a diagnosed fault, as the identified configurations or the identified network characteristics may be appropriate or acceptable for a WAN operator and/or an end-user's LAN.

Figure 3:
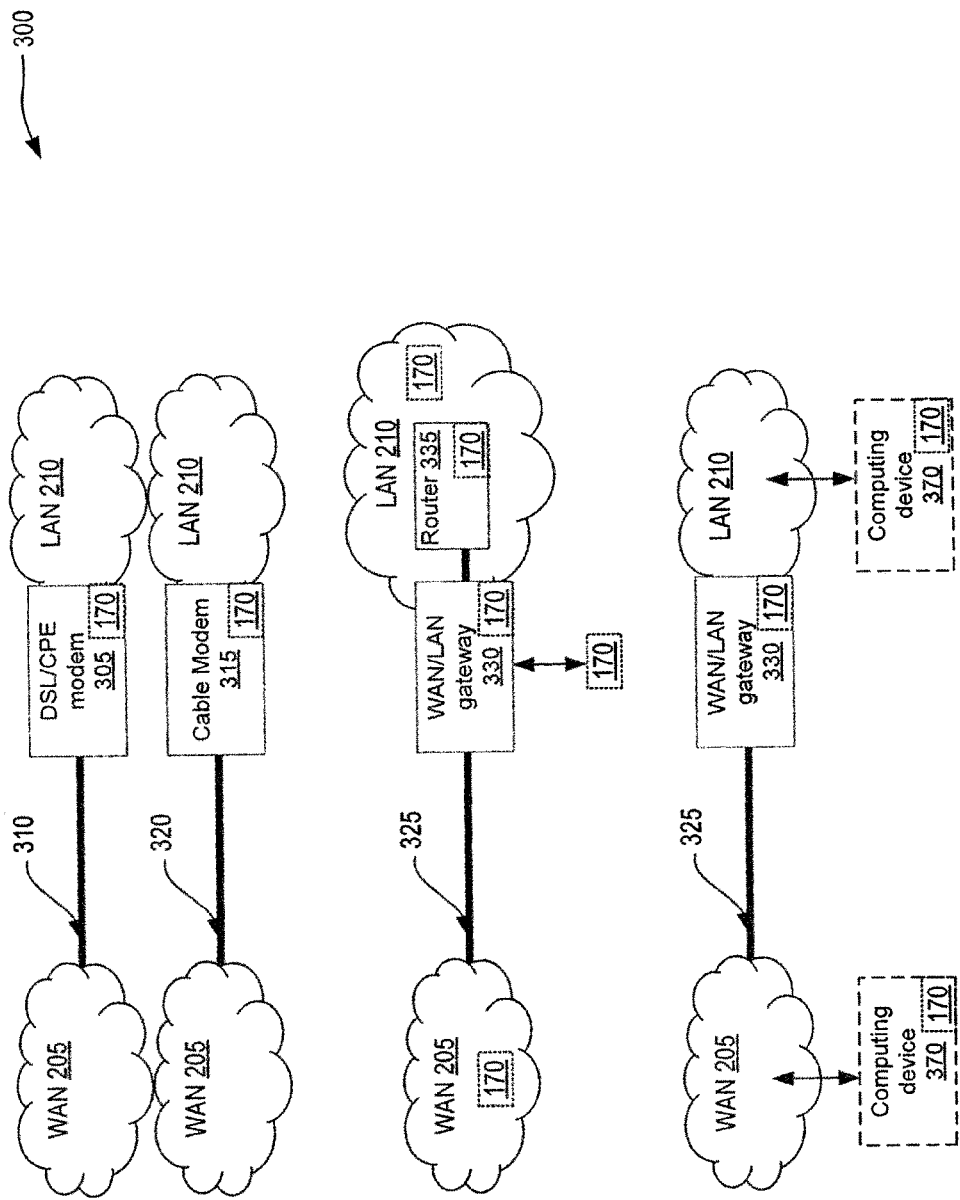
FIG. 3 illustrates an alternative exemplary architecture in which embodiments may operate.

FIG. 3 illustrates an alternative exemplary architecture 300 in which embodiments may operate. For example, responsive to an operational condition being identified, the implementation module 235 may initiate one or more complementary management events. For example, the responsive management event may be limited to reporting the identified operational condition by generating and sending an appropriate report. Alternatively, in accordance with certain embodiments, the implementation module 235 may undertake specific actions to modify the identified operational condition, such as initiating a configuration change or executing corrective action instructions to affect the identified operational condition.

Which management event is triggered by a management device 170 may depend on the type of operational condition identified and also on how the management device 170 relates operationally to the WAN 205, to the LAN 210 and/or to the source or location of the LAN and/or WAN information upon which the identified operational condition is based.

For example, in one embodiment, the management device is implemented within a Digital Subscriber Line (DSL) modem 305, operating as a Customer Premises Equipment (CPE) device to communicatively interface a DSL based backhaul 310 provided via the WAN 205 to the LAN 210. Such a DSL modem 305 may be accessible and at least partially configurable by an end-user consumer of the DSL service. In an alternative embodiment, the management device may be implemented within a DSL modem operating at a central office. In such an embodiment, the DSL modem may operate under the control of a DSL operator, yet nevertheless have access and authority to collect information from the LAN 210.

In one embodiment, the management device 170 is implemented within and operates as a cable modem 315 at an end-user consumer location. In such an embodiment, the cable modem 315 communicatively interfaces a cable network based backhaul 320 provided via the WAN 205 to the LAN 210.

In an alternative embodiment, the management device is implemented within a powerline modem at an end-user consumer location. In such an embodiment, the cable modem communicatively interfaces a powerline based (e.g., electric utility based backhaul) provided via the WAN 205 to the LAN 210. The management device may similarly be implemented within a wireless modem operating to communicatively interface a wireless based backhaul provided via the WAN to the LAN; or be implemented within an Optical Network Terminal (ONT) operating to communicatively interface a fiber optic based backhaul provided via the WAN to the LAN.

In accordance with disclosed embodiments, the WAN provides Internet connectivity to a Local Area Network via one of: a wireless network connection; a wired network connection; a Digital Subscriber Line (DSL) network connection; a powerline network connection; a Passive Optical Network (PON) based network connection; a fiber optic based network connection; a cable based network connection; and a wireless network connection, such as WiFi connectivity at hotspots, or mobile data connectivity via technologies and standards such as WiMax, 3G/4G, LTE. The management device 170 may be implemented within and operate as an interfacing device between any such WAN based connection and a connected LAN, in which case the WAN provides Internet connectivity to the management device 170 which may additionally implement an appropriate WAN/LAN interface, such as a WAN to LAN gateway 330 or WAN/LAN bridge.

The management device 170 need not necessarily operate within a modem or within a device interfacing the respective WAN and LAN networks. For example, in one embodiment, the management device is implemented within a router 335 operating to communicatively interface a WAN backhaul 325 with the LAN. In such an embodiment, the router 335 may operate within the LAN 210 and connect with the WAN back-haul 325 through a WAN/LAN gateway 330 as depicted, or alternatively, the router 335 implementing the functionality and capabilities of the management device (e.g., 170) may connect directly with a WAN back-haul 325. In some embodiments, a WAN/LAN gateway 330 device is combined with a LAN based router 335 and implements the management device capabilities.

In one embodiment, management device 170 is implemented separately from a router 335, gateway device 330, computing device 370, DSL/CPE modem device 305, and cable modem 315, for example, management device 170 may operate as a standalone unit. FIG. 3 depicts various alternative deployment examples of management device 170 being implemented separately from such devices and operating within WAN 205 or within LAN 210, thus enabling management device 170 to collect information from the respective networks. Alternatively, management device 170 may be implemented separately from such devices but interface directly to another device, such as to the WAN/LAN gateway 330 as depicted or to a modem (e.g., 305, 315) or as a peripheral device attached to a computing device (e.g., 370), thus enabling management device to collect information from the respective networks and perform other operations as described herein. Other combinations are also feasible where the management device 170 is enabled to collect information from each of a WAN 205 and a LAN 210 as described herein.

In accordance with disclosed embodiments the LAN interfaces one or more networked devices operating within the LAN to the management device via one or more of: an Ethernet based network connection; a wireless based network connection; an Institute of Electrical and Electronics Engineers (IEEE) 802.11 standards based network connection; an 802.11a, 802.11b, 802.11g, and/or 802.11n WiFi compatible network connection; a femto network connection transmitting via a mobile cellular compatible protocol including at least one of a third generation (3G) compatible protocol, a fourth generation (4G) compatible protocol, and a Long Term Evolution (LTE) compatible protocol; a powerline connection; a telephone system connection; a Plain Old Telephone Service (POTS) connection; an ITU G.hn connection; a Coax cable connection; and a wireless network connection, such as WiFi connectivity at hotspots, or mobile data connectivity via technologies and standards such as WiMax, 3G/4G, LTE. The management device 170 may be implemented within and operate as one of the networked devices operating within the LAN, for example, as a computer communicatively interfaced with the LAN 210.

In some embodiments, the management device does not operate inline with the communication channel related to the WAN and the LAN in the way that a WAN/LAN gateway 330 or a modem operating between the WAN and the LAN operates. Instead, the management device may be implemented within a computing device 370 remotely located from a WAN/LAN interface through which a communication channel related to the WAN 205 and the LAN 210 is connected. Such a computing device may provide remote monitoring and management functionality for the WAN/LAN interface, such as monitoring, collecting, and analyzing data associated with an ISP's WAN back-haul 325 or associated with a WAN/LAN gateway 330 device.

Computing device 370 may operate within the LAN 210 and communicate with LAN devices over LAN 210 connections and protocols and additionally communicate with WAN based devices over a WAN back-haul 325 connecting the LAN to the WAN. Computing device 370 may alternatively operate within the WAN 205. In such an embodiment, the computing device 370 need not necessarily be associated with a WAN operator, such as an ISP, providing internet services to an end-user consumer. For example, a computing device 370 that implements the management device functionality may operate on the Internet beyond the infrastructure owned or operated by an ISP providing the WAN back-haul 325, but nevertheless communicate with WAN based devices over the ISP's network via WAN 205 and communicate with LAN based devices via a WAN/LAN gateway 330 which connects LAN 210 to the WAN 205. In an alternative embodiment, computing device 370 may communicate with WAN based devices and/or LAN based devices via an out-of-band interface. For example, rather than communicating with LAN/WAN based devices over the WAN 205 or LAN 210 networks, a computing device 370 implementing the management device capabilities may communicate over a management interface that connects over a separate communication channel, such as over a wireless cellular connection or by establishing a separate dial-up modem connection over an analog telephone line. In one embodiment, the management devices 170 or multiple management devices 170 are controlled by a third party operator, other than the owner/operator of the LAN and other than an owner/operator of the WAN. For example, a service provider may provide management, support, provisioning, and distribution services for multiple management devices so as to jointly optimize WAN/LAN network communications. Such a third party operator may contract with either a LAN owner/operator or a WAN owner/operator to provide such joint WAN/LAN network optimization services via one or more management devices 170.

In one embodiment, a management device 170 initiating a management event responsive to an operational condition being identified includes the management device 170 generating instructions and to communicate the generated instructions to one or more devices selected from: a network element, a WAN device, and/or a LAN device communicatively interfaced with the management device 170. In such an embodiment, the generated instructions may be communicated via one of: a TR-069 (Technical Report 069) compatible communications protocol; a Transmission Control Protocol/Internet Protocol (TCP/IP) communications protocol; a Simple Network Management Protocol (SNMP) communications protocol; an out-of-band telephone line protocol; a Digital Subscriber Line Ethernet over Coax (DSL EOC) communications protocol; a cable control channel communications protocol; a powerline control channel communications protocol; a Command Line protocol (CLI); via a wireless device; or via a mobile device.

In accordance with certain embodiments, one of the above protocol transfer mechanisms is utilized to transfer instructions from the management device 170 over a LAN interface of the management device to LAN based devices, utilized to transfer instructions from the management device 170 over a WAN interface of the management device to WAN based devices, or utilized to transfer instructions from the management device 170 over a management interface of the management device to one or more networked devices.

In some embodiments, initiating a management event includes the management device 170 generating instructions to change an identified operational condition. In one embodiment, the management device 170 further executes the generated instructions. For example, the management device 170 may execute the commands within the management device 170 locally to change the configuration of the management device. For example, where the management device 170 is implemented within a WAN/LAN gateway or within a modem or a router, the management device may generate instructions and execute the instructions locally to change the configuration of the WAN/LAN gateway, modem, or router.

Alternatively, the management device may need to send the generated instructions to a distinct device to trigger or initiate a change to an identified operational condition. For example, where a management device 170 is located within a LAN based device and identifies an operational condition within a WAN based device (such as a fault or an unwanted configuration), the management device 170 may send or transmit the generated instructions to a second networked device to trigger or initiate a change. In some embodiments, the management device 170 may be able to remotely execute commands on a second networked device directly (e.g., via a remote command shell or a remote command interface). In alternative embodiments, the management device 170 sends an execution request to a second networked device soliciting execution of the commands or instructions.

For example, in one embodiment, initiating a management event responsive to the operational condition being identified constitutes an implementation module 235 of the management device 170 to generate commands based on the joint analysis to change a configuration of a LAN device communicatively interfaced with the management device and execute the commands against the LAN device to change the configuration of the LAN device.

In an alternative embodiment, initiating a management event responsive to the operational condition being identified constitutes an implementation module 235 of the management device to generate a request based on the joint analysis, in which the request specifies a configuration change to be implemented by a WAN operator, and the management device 170 to additionally send the request to the WAN operator triggering the WAN operator to implement the configuration change.

For example, the management device may collect or estimate one or more user preferences, analyze the one or more user preferences, and determine that a configuration change implemented by the WAN operator implements one or more of the user preferences. In such an example, an implementation module of the management device may responsively generate instructions to change the operational condition based at least in part on the one or more user preferences and transmit such instructions to the WAN operator. If the management device was located within a WAN based device, such as within a DSL modem operating at a central office, the instructions may be instead executed locally, for example, to alter a DSL connection configuration settings or configuration controlled by the WAN operator. User preferences may specify various configurable or manageable characteristics for either the WAN or the LAN or both. For example, user preferences may indicate that the WAN and/or LAN should be optimized for streaming video, or gaming, or large data transfers, etc. Such optimizations may correspond to distinct operational settings affecting, for example, latency, error correction, transmit power, etc. User preferences may indicate a desired service level, which may correspond to a particular pricing scheme. For example, user preferences may indicate a less expensive rate plan in exchange for a reduced bandwidth transmit rate or a reduced bandwidth cap, or vise-versa.

In one embodiment, user preferences may be implicitly derived rather than explicitly specified. For example, a WAN operator providing internet bandwidth to an end-user may determine based on network traffic originating from the end-user's LAN that a certain class of network traffic is predominate or prioritized over the communication channel related to the WAN and the end-user's LAN. In such an embodiment, the management device operating at the WAN, having collected information from the LAN, may responsively alter the operational configuration of the WAN/LAN communication channel to optimize the communication channel for the predominate or prioritized class of network traffic.

In accordance with embodiments of the invention, initiating a management event responsive to the operational condition being identified includes the management device 170 (e.g., via its implementation module) may perform one or more of the following operations: 1) generate instructions to reduce transmit power of WAN elements (e.g., WAN based transceiver elements) when LAN bandwidth utilization is below a threshold; 2) generate instructions to reduce transmit power of LAN elements (e.g., LAN based transceiver elements) when WAN bandwidth utilization is below a threshold; 3) generate instructions to modify one or more parameters affecting WAN forward error correction (FEC), WAN latency, WAN transmit power levels, and WAN data rate, based on the collected LAN information; 4) generate instructions to modify an active Digital Subscriber Line (DSL) profile or configuration settings based on identifying network traffic related to the WAN and the LAN comprising a data type (e.g., a data class or a class type) corresponding to at least one of: video data, audio data, text data, graphical data, Voice over Internet Protocol (VoIP) data, or network gaming data, wherein the active DSL connection configuration settings is modified to optimize transmission parameters for the identified data type; and 5) generate instructions to reduce power of a DSL transceiver operating within the WAN based on data utilization levels detected within the LAN.

The above instructions each implement a change to an identified operational condition. Optimizing WAN/LAN based communications may at times, constitute reducing transmit rates and transmit power, so as to achieve reduced energy usage. Reducing transmit rates and power levels on a LAN or WAN based transceiver may be selected when it is determined that the respective network is not being actively utilized. Such optimization may not only reduce energy usage for the respective LAN or WAN based elements, but may improve network communications for other consumers of the WAN or for other LANs which may benefit from, for example, less contention for network resources.

The above optimizations may alternatively implement or trigger LAN or WAN configuration changes that alter network characteristics. For example, a WAN configuration may be modified based on collected LAN information that identifies an operational condition within the LAN that corresponds to usage or consumption of a particular class of network traffic. For example, where it is determined that streaming video is being actively consumed by a LAN device, management device 170 may responsively configure the WAN to implement a higher data rate connection with minimized data correction where a streaming video may benefit from an increased data rate and may not be adversely affected by a minimized correction scheme (e.g., stream errors may generate momentary pixilation but may not require correction as the errored frame likely has already passed, and thus, may not be referenced again or even referenceable, by the time correcting data is provided). Conversely, a particular class of data may benefit from minimized latency such as VoIP data which requires a low data rate, but may frustrate human users where a delay attributable to network latency is present. Other examples, may include gaming data which may benefit from low latency, not necessarily require high data rates, but in certain situations may require high data accuracy. Bursty file transfers (e.g., large but intermittent) and steady data streams may similarly be identified and optimized (e.g., accuracy may be very important but latency may be less important).

In some embodiments, WAN side configurations are altered based on collected LAN information, or LAN side configurations are altered based on collected WAN information, or both LAN and WAN side configurations may be altered based on collected LAN and/or WAN information. For example, a LAN device may overload a WAN back-haul connection by providing data faster than the WAN is capable of transmitting traffic. In such an instance, network communications may be optimized by reducing the data rate at which LAN information is provided to the WAN. Aligning these rates may reduce collisions and buffering errors due to a traffic backlog. The opposite may equally be true. A WAN back-haul may be capable of providing data to a LAN device faster than the LAN device itself can process the data, thus creating an un-optimized mismatch from the WAN to the LAN device, and thus providing an opportunity for joint optimization.

In one embodiment where the identified operational condition corresponds to a problem or a fault, the implementation module responsively generates and instantiates execution of instructions to remedy the fault. For example, the instructions may be instantiated within the management device, within a LAN device connected via the LAN interface, within a WAN device connected via the WAN interface, or within a network element connected to the management device via a management interface of the management device.

In one embodiment, information collected from the LAN 210 and WAN 205 relates to two distinct communication layers. One example of the two communication layers is two layers of the Open Systems Interconnection model (OSI model). The OSI model is a commonly used model describing the different data processing layers, in digital communication systems. The communication layers could also correspond to other communication protocols or layers such as TCP/IP which might not directly correspond to one of the layers of the OSI model.

For example, information from one layer on the WAN 205 may be used to diagnose or improve the performance on a different layer on the LAN 210, or vice versa. In one embodiment, information is collected from the LAN 210 (for example, collected from a home network) by the Management device 170. Based on analysis of the information by the Management device 170, a management event initiated by the Management device 170 responsive to the analysis is applied to the WAN 205. In one example, a management event may include adjusting settings and configurations on a WAN 205 (for example a DSL network) in response to the analysis. Information collected from the LAN 210 may be from different layers of the LAN 210, such as from the application layer and the networking layer. The settings and configuration on the DSL system may be implemented at the physical layer, by setting physical layer parameters of the DSL system. For example, the DSL system physical layer settings may be implemented through the setting of the DSL connections configuration settings. Implementing physical layer settings may be performed at the Central office (CO) side or at the (Customer Premises Equipment) CPE side. It is noted that in the absence of the Management device 170, it is not possible to optimize or monitor the performance of the LAN, based on information from the WAN or to optimize or monitor the performance of the WAN, based on information from the LAN. This is because the control mechanisms and control channels on the two networks are distinct and separate. A Management device 170 as described herein addresses such a problem and enables such monitoring and optimizations which are not otherwise feasible.

In another example, data and information may be collected at a networking layer, or TCP/IP layer from the LAN 210. Such information may, for example, be related to the performance of the LAN 210. The information may, for example, indicate packet data rate, packet error rate, throughput, or TCP/IP related information regarding quality of the link, such as packet retransmission rate, etc. For example, where analysis indicates the TCP/IP layer on the LAN 210 side is experiencing excessive dropped packets or a lower than expected throughput, and yet, no known issues with the LAN are detected, the underlying problem may be attributed to the WAN 205 side. In a particular case, where the WAN 205 is a DSL connection, the DSL link settings and configuration could be changed, for example, initiating the change as a management event responsive to the above analysis. DSL connection setting may be implemented at the physical layer. For example, the DSL coding may be improved by adjusting the Forward Error Correction (FEC) parameters (e.g., channel coding). Alternatively, DSL rate may be decreased to improve link stability and quality. Other management events could include higher INP (Impulse Noise Protection) parameter setting, improved margin parameter settings and/or power parameter settings. In this example, the management device 170 would collect the information, perform the analysis, and initiate a management event, for example, by sending instructions to a DSL controller interfaced via a WAN interface 215 of the management device 170. The management event thus corresponds to the reconfiguration setting of the DSL connection.

In the above examples, information on the networking layer of the LAN 210 is used to configure settings at the physical layer on the WAN 205. Similarly, information and data collected from other layers may be incorporated. For example, information from the application layer on the LAN may be used. Take for example, a video streaming system where an MPEG (Moving Picture Experts Group) data stream is received with errors at the receiving side on the LAN 210. One or more of channel coding parameters, INP (Impulse Noise Protection) parameters, margin parameter settings, power parameter settings, and/or data rate parameters for the DSL connection may be altered or modified to compensate for the receiving side errors in the video data stream.

The receiving side may be a TV set, a multi-media gateway, a personal computer, or other device capable of receiving the MPEG video stream. Physical layer profiles on the WAN 205 may be changed to address the problem (e.g., the received errors) on the LAN 210 side. For example, if the WAN 210 is a DSL system and analysis of the WAN 210 shows instability on the DSL line, then the problems on the LAN's 210 application layer may be attributed to the WAN 205 side, in this example, the problem/errors may be attributable to the DSL system. In such an example, DSL system settings (e.g., settings and parameters on the WAN 205) may be set to stabilize the WAN DSL connection(s). For example, a new profile or DSL system configuration settings may be set on the DSL system, including, for example: improved coding, higher INP (Impulse Noise Protection) parameter setting, improved margin parameter settings, power parameter settings, and/or a lower data rate. In such an example, the management device 170 would collect the information, perform the analysis, and initiate a management event to, for example, a DSL controller communicatively interfaced to the management device 170, for example, interfaced via WAN interface 215. The management event thus corresponding to the reconfiguration of settings on the DSL connection, as described by the examples above.

In one embodiment, joint analysis includes finding problems or impairments on both the WAN 205 and the LAN 210 by analyzing the collected information from the LAN side and/or the WAN side. Take for example a WAN 205 supported by a DSL connection, and a LAN 210 supported by an HPNA (Home Phoneline Networking Alliance) connection. In the case of HPNA, the same telephone wiring used for the DSL based WAN access may also be used for HPNA based LAN communications within the LAN premises (for example local network communications within a home network). In some HPNA systems the frequencies of operation are above the ones used in the DSL connection. In such cases, impairments associated with the operational frequency bands may affect both the LAN 210 and the WAN 205 in similar ways. For example, radio frequency (RF) interference such as impulse noise or crosstalk affecting the operational frequencies on the DSL line may similarly affect operation of the HPNA system. With HPNA, even if the frequency bands are not overlapping, the sources of interference and crosstalk may nevertheless impact frequencies both on the HPNA based LAN 210 as well as frequencies on the DSL based WAN 205. For example, a broadband noise source or harmonics of a crosstalk or interference source covering non-overlapping frequencies bands. Thus, in accordance with one embodiment, information regarding such interference is analyzed on the WAN side (e.g., by analyzing the bit distribution or other related parameters on the DSL connection it may become apparent that the line is being affected by RF interference, such as impulse noise or high power noise). In such as case, the resulting analysis of WAN 205 side information indicates the related problems on the LAN 210 side are related to the RF interference. Conversely, in the absence of analysis done on the WAN 205 (e.g., DSL connection), it would not be possible to directly analyze the LAN 210 information (e.g., the HPNA based system). In such a way, the WAN information enables identifying and detecting or diagnosing the source of problem on the LAN 210. This made possible despite current HPNA based systems failing to provide relevant data through their control or management interfaces from which information regarding interference may otherwise be analyzed. It is possible to analyze the physical layer information on a DSL connection (such as bit distribution) to infer information about noise or interference. In case the source of the problem is found or diagnosed to be interference or external noise, the settings on the DSL connection may be adjusted to mitigate or reduce the effect of the problem. For example, the DSL coding may be improved by adjusting the FEC parameters, the DSL rate may be decreased to improve the link stability and quality, or the INP settings may be changed to guard against impulse noise, or margin parameter settings could be improved, and/or power settings. In some cases, the mitigation may be done by instructing the LAN user to physically move their LAN devices (such as an HPNA gateway or a WiFi base-station) to a different location, so as to reduce exposure of such a device to the source of interference or external noise.

In such an embodiment, the management device 170 collects WAN and LAN diagnostics information from the WAN 205 (for example a DSL connection) and from the LAN 210 (for example a HPNA based LAN) respectively, performs joint analysis on the WAN/LAN diagnostics information, and diagnoses a fault. In the above example, the fault being the existence of interference or external noise. Joint analysis may include correlating information on the collected information from the LAN with the information collected from the WAN. For example, information from the LAN may include the time periods when the LANs throughput is below a threshold based on the LAN settings, indicative that a problem is present on the LAN. Joint analysis may further include correlating the above information with the duration of time when external noise or interference was observed on the WAN. High correlation among the two time periods (ascertained from the joint analysis) may be an indication that the problem on the LAN is related to the external noise and interference. In such a case, the management device 170 may responsively initiate a management event to the DSL controller initiating the reconfiguration of settings affecting the DSL connection, as described by the various examples above. A management event may alternatively be issued to the LAN side, for example recommending the location change of the LAN device, as described above.

In one embodiment, the management device 170 performs joint analysis of data throughput information on the LAN and the WAN. For example, the LAN may include a wireless device (e.g., a Femto cell, WiFi, etc.) and the WAN may include a DSL based connection. In this embodiment, the LAN side throughput performance is optimized or improved by optimizing the settings on the WAN side (e.g., the DSL connection). In another embodiment, the LAN side throughput problem is diagnosed by analyzing information from the WAN side. For example, it is possible that the LAN system, such as the WiFi access point or the FemtoCell base-station, are set to transmit information at the highest possible rate and throughput, yet the WAN side throughput is set to a lower data rate which does not support the needed throughput required by the LAN. Analyzing the information from the LAN would indicate the WAN settings needs to be adjusted. If the WAN supports a higher throughput, the Management device 170 may initiate a management event to the WAN controller, such as a DSL system controller on the CPE side or CO side, demanding an increase in the supported data rate or throughput. Correspondingly, the LAN may be limited to supporting a lower data rate than the WAN, yet the WAN is nevertheless configured to higher data rate (e.g., a rate greater than that which is supported by the LAN). In such a case, it is possible that a DSL based WAN link is not only wasting power, but may additionally be more prone to instability. DSL links are more susceptible to noise and other impairments when operating at high data rates because they are typically operating at lower margins. In such a case, Management device 170 initiates a management event, sending instructions to the WAN (such as DSL controller) to lower the data rate on the WAN side, making the WAN connection more stable. Additionally, a mismatch between the WAN and the LAN throughputs may cause errors on both networks due to the overloading of buffering mechanisms on the gateways between the WAN and the LAN. For example, network congestion on the LAN side, requiring higher data throughput on the WAN/LAN connection may overwhelm the WAN/LAN gateway (such as the WAN/LAN gateway 330) between the WAN and the LAN. In such a case, the WAN throughput needs to accordingly increase to overcome the throughput shortage. For example, if the WAN is a DSL connection, the data rate on the DSL connection should be increased to support the higher throughput demand on the WAN side, however, conventional DSL systems and WAN systems are not capable of automatically detecting such demands on the LAN (e.g., detecting the need for an increased data rate and responsively implementing the increases), because the control mechanisms and control channels on the two networks are distinct and separate, hence the need for a Management device 170 as described herein which addresses such a problem.

In another embodiment, WAN settings are optimized to match the data communication types on the LAN. For example, the data communications types on the LAN may include information on traffic types which are delay sensitive, for example voice communication data. Analyzing the collected information from the LAN, by the Management device 170, indicates that the data types are voice communications and therefore delay sensitive. In such a case, the Management device 170, by initiating a management event, would adjust the WAN settings in order to support delay sensitive traffic (e.g., traffic requiring very low latency). For example, when the WAN is a DSL system, the DSL connection configuration settings may be adjusted to induce lower latency. Setting of the adjusted DSL connection configuration settings is initiated by the Management device 170 via triggering a management event. In another example the delay and INP settings, which are two DSL physical layer parameters, are set to their respective minimums, or set to the lowest possible values which allow the DSL communication link to maintain acceptable stability and maintain required quality and performance levels. INP and delay settings may be implemented or changed via management events initiated by the Management device 170.

Figure 4:
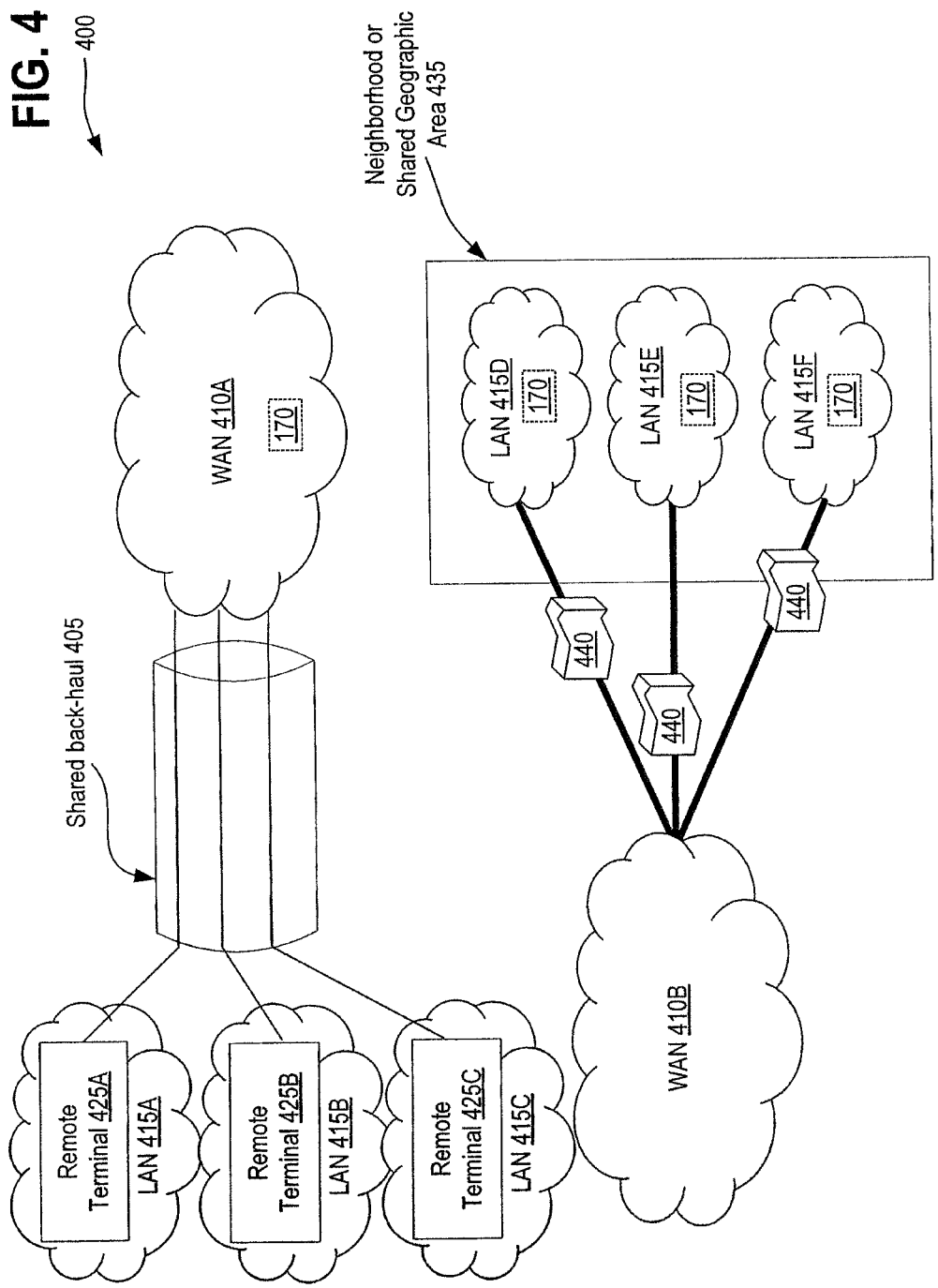
FIG. 4 illustrates an alternative exemplary architecture in which embodiments may operate.

FIG. 4 illustrates an alternative exemplary architecture 400 in which embodiments may operate. In accordance with certain embodiments, collected LAN information includes neighborhood analysis relating to Internet connectivity provided to a plurality of locations in a neighborhood or a shared geographical area 435 with the management device 170. In such an embodiment, initiating a management event includes a management device generating instructions/commands to change a configuration of a WAN device based on the neighborhood analysis collected. In an alternative embodiment, initiating a management event includes a management device generating instructions to change a configuration of a LAN device based on the neighborhood analysis.

Neighborhood analysis may be conducted when information from multiple sources may be aggregated to provide a broader analytical context. For example, remote terminals 425A, 425B, and 425C are depicted as traversing a shared back-haul 405 to a WAN 410A. WAN 410A includes a management device 170 implemented as described herein. Because remote terminals 425A-C all traverse a common back-haul 405, information may be retrievable from each of the remote terminals 425A-C and correspondingly from Local Area Networks 415A, 415B, and 415C respectively. The information may be collected by management device 170 within WAN 410A and utilized to optimize the WAN and LAN networks and the communication paths between the respective WAN and LAN networks.

For example, a shared back-haul 405 may exist with DSL networks in which multiple twisted pair lines traverse a common DSL binder; a shared back-haul 405 may be present with multiple coaxial cable internet customers each contending for WAN based resources over a single coaxial cable over which at least a portion of WAN back-haul is implemented; a shared back-haul 405 may be present with a power line based Internet service provider in which multiple LANs (e.g., 415A-C) associated with distinct end-users contend for WAN based resources over the same physical transmission lines; a shared back-haul 405 may similarly be present where multiple LANs (e.g., 415A-C) associated with distinct end-users contend for WAN based resources over the same wireless transmission spectrum; a shared back-haul 405 may be present with fiber optic based connections each contending for WAN based resources; or a share back-haul 405 may comprise of a combination of the above communication means, such as a combination of coaxial cable, fiber and twisted pairs.

In such embodiments, a management device 170 may collect information from multiple distinct LANs and analyze the collected information from the multiple LANs to identify an operational condition. Such analysis may be referred to as neighborhood analysis. The management device 170 may then report, diagnose, monitor, or generate instructions to implement an operational change based on the neighborhood analysis. For example, the management device 170 may implement WAN/LAN network optimizations which include increasing transmit power and data rates to one LAN (e.g., 415A) based on determination that another LAN represented within the neighborhood analysis is inactive or has a low activity rate (e.g., LAN 415C may be determined to be underutilized). In such an embodiment, a corresponding decrease of transmit power and data rate may be implemented for the underutilized LAN (e.g., 415C in such an example).

In another embodiment, neighborhood analysis may indicate that the shared back-haul 405 is saturated due to a demand load in excess of capacity based on analysis of LAN information retrieved from the multiple distinct LANs 415A-C in which case the management device 170 may responsively implement a load-balancing algorithm on a WAN/LAN interface (e.g., a DSL modem, cable modem, ONT unit, etc.) interfacing each of the respective LANs 415A-C to the single shared back-haul 405. In such a way, overall network efficiency may be improved by reducing collisions, buffering queues, data re-transmits, and other excessive overhead waste that may occur due to an overwhelmed network communication path, such as a shared WAN back-haul 405.

In accordance with an alternative embodiment, a collection module of a management device 170 collects the neighborhood analysis from a WAN operator (e.g., WAN 410B), where the neighborhood analysis describes LAN wireless transmission channels for a plurality of locations in a shared geographical area with the management device. For example, within the neighborhood or shared geographical area 435 are multiple distinct LANs 415D, 415E, and 415F. Each of the distinct LANs 415D-F are transmitting information 440 to WAN 410B, such as an ISP or Wide Area Network Operator. The information 440 sent via each of the LANs may describe various characteristics about the LAN from which the information originated. In one embodiment, the WAN 410B aggregates the information 440 and makes the aggregate information available as neighborhood analysis. Each management device 170 within each of the respective LANs 415D-F may then collect and analyze the neighborhood analysis, and may additionally implement operational changes within a corresponding LAN 415D-F based on the information collected from the WAN 410B.

Thus, in accordance with one embodiment, instructions are generated by a management device 170 to change the configuration of a LAN device based on the neighborhood analysis. In one embodiment, the generated instructions select a LAN wireless transmission channel for a LAN device communicatively interfaced with the management device 170 that minimizes wireless interference between the LAN device and a plurality of other locations in the neighborhood or shared geographical area 435 with the management device 170. In some embodiments, each of the management devices within the various LANs 415D-F implement similar instructions, although, the management devices 170 within the respective LANs 415D-F need not have operational awareness of any other management device 170 as the neighborhood analysis is collected from WAN 410B. In alternative embodiments, a management device within the WAN 410B or located elsewhere may initiate instructions to implement an operational change within the WAN or within multiple distinct LANs.

In the above embodiment, operational efficiency of the individual LANs may be improved by reducing interference between closely located LANs, based on the neighborhood analysis. Such information may be correlated by a WAN operator based on, for example, mapping overlapping identifiers to a virtually rendered neighborhood or shared geographic area 435 or alternatively, based on actual knowledge of geographic locations for multiple LANs 415, for example, by cross referencing subscribers' service address information to physical locations.

Diagnostics may similarly rely upon neighborhood analysis yielded from multiple distinct LANs 415. For example, multiple LAN devices exhibiting high error counts, or abnormal retrains/modem resets, may be indicative of a fault within the WAN infrastructure rather than a statistically less likely coincidence that multiple LAN side devices are each simultaneously exercising a similar fault. In a complementary way, neighborhood analysis from multiple LANs 415 within a common geographical area or multiple LANs associated with a single shared back-haul 405 may aid in systematically diagnosing a LAN side fault within a particular end-user consumer's local area network where similar devices operating in neighboring LANs 415 do not present corresponding errors or faults within the neighborhood analysis.

Figure 5:
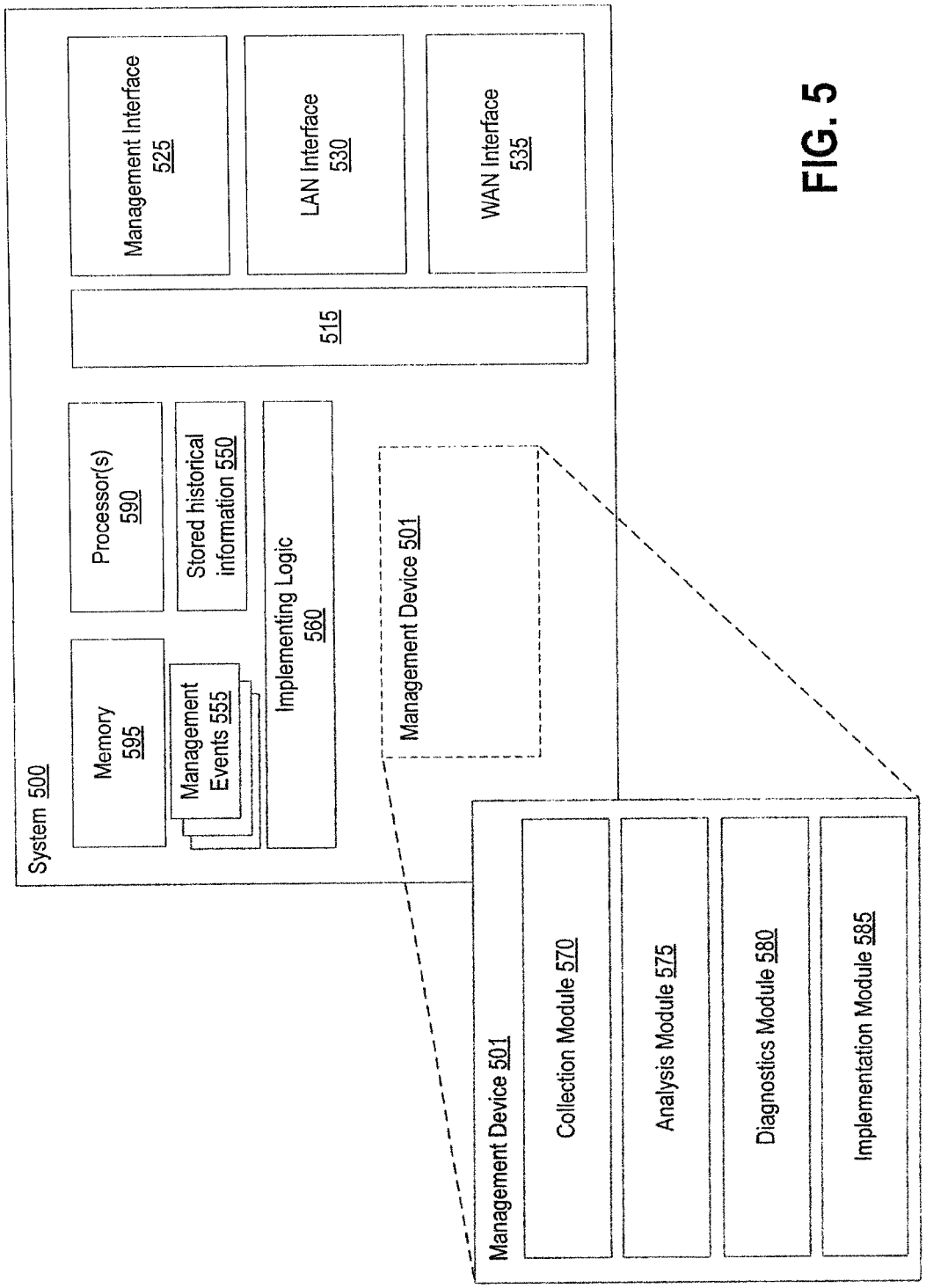
FIG. 5 shows a diagrammatic representation of a system in which embodiments may operate, be installed, integrated, or configured.

FIG. 5 shows a diagrammatic representation of a system 500 in which embodiments may operate, be installed, integrated, or configured.

In one embodiment, system 500 includes a memory 595 and a processor or processors 590. For example, memory 595 may store instructions to be executed and processor(s)

590 may execute such instructions. Processor(s) 590 may also implement or execute implementing logic 560 having logic to implement the methodologies discussed herein. System 500 includes communication bus(es) 515 to transfer transactions, instructions, requests, and data within system 500 among a plurality of peripheral devices communicably interfaced with one or more communication buses 515. In one embodiment, system 500 includes a communication means 515 to interface, transfer, transact, relay, and and/or communicate information, transactions, instructions, requests, and data within system 500, and among plurality of peripheral devices. System 500 further includes management interface 525, for example, to receive requests, return responses, and otherwise interface with network elements located separately from system 500.

In some embodiments, management interface 525 communicates information via an out-of-band connection separate from LAN and/or WAN based communications, where "in-band" communications are communications that traverse the same communication means as payload data (e.g., content) being exchanged between networked devices and where "out-of-band" communications are communications that traverse an isolated communication means, separate from the mechanism for communicating the payload data. An out-of-band connection may serve as a redundant or backup interface over which to communicate control data between the management device 170 and other networked devices or between the management device 170 and a third party service provider.

System 500 further includes LAN interface 530 to communicate information via a LAN based connection, including collecting LAN information from within a LAN, reporting information and diagnostics to other entities within the LAN, and for initiating instructions and commands over the LAN. Information communicated via a LAN interface 530 may, in some embodiments, traverse the LAN to a LAN to WAN interface and continue to a destination within a connected WAN. System 500 further includes WAN interface 535 to communicate information via a WAN based connection, including collecting WAN information from within a WAN, reporting information and diagnostics to other entities within the WAN, and for initiating instructions and commands over the WAN. Information communicated via WAN interface 535 may, in some embodiments, traverse the WAN to a WAN to LAN interface and continue to a LAN based destination.

System 500 further includes stored historical information 550 that may be analyzed or referenced when conducting long term trending analysis and reporting. System 500 may further include multiple management events 555, any of which may be initiated responsive to the identification of an operational condition. For example, corrective actions, additional diagnostics, information probes, configuration change requests, local commands, remote execution commands, and the like may be specified by and triggered as a management event 555. Similarly, operational reports, configuration reports, network activity reports and diagnostic reports may be generated and sent in accordance with stored management events 555. The stored historical information 550 and the management events 555 may be stored upon a hard drive, persistent data store, a database, or other storage location within system 500.

Distinct within system 500 is Management Device 501 which includes collection module 570, analysis module 575, diagnostics module 580, and implementation module 585. Management Device 501 may be installed and configured in a compatible system 500 as is depicted by FIG. 5, or provided separately so as to operate in conjunction with appropriate implementing logic 560 or other software.

In accordance with one embodiment, collection module 570 collects information from available sources, such as LAN information and WAN information via interfaces of system 500, including one or more of management interface 525, LAN interface 530, and/or WAN interface 535. Analysis module 575 analyzes the information retrieved via collection module 570. In some embodiments, LAN information and WAN information is jointly analyzed to identify an operational condition within the LAN based on collected WAN information or identify an operational condition within the WAN based on collected LAN information. Analysis module 575 may further perform long term trending analysis based on stored historical information 550 or conduct neighborhood analysis based on aggregation data yielded from multiple separate and distinct LANs. Diagnostics module 580 may conduct specialized diagnostic routines and algorithms in conjunction with or separately from analysis module 575. Diagnostics module 580 may conduct additional probing diagnostics to retrieve or trigger the output of additional diagnostics information for further analysis. Implementation module 585 implements and initiates various management events 555 including generating and instantiating instructions for local or remote execution, generating and transmitting configuration change requests, generating and sending operational reports, diagnostic reports, and configuration reports.

Figure 6A:
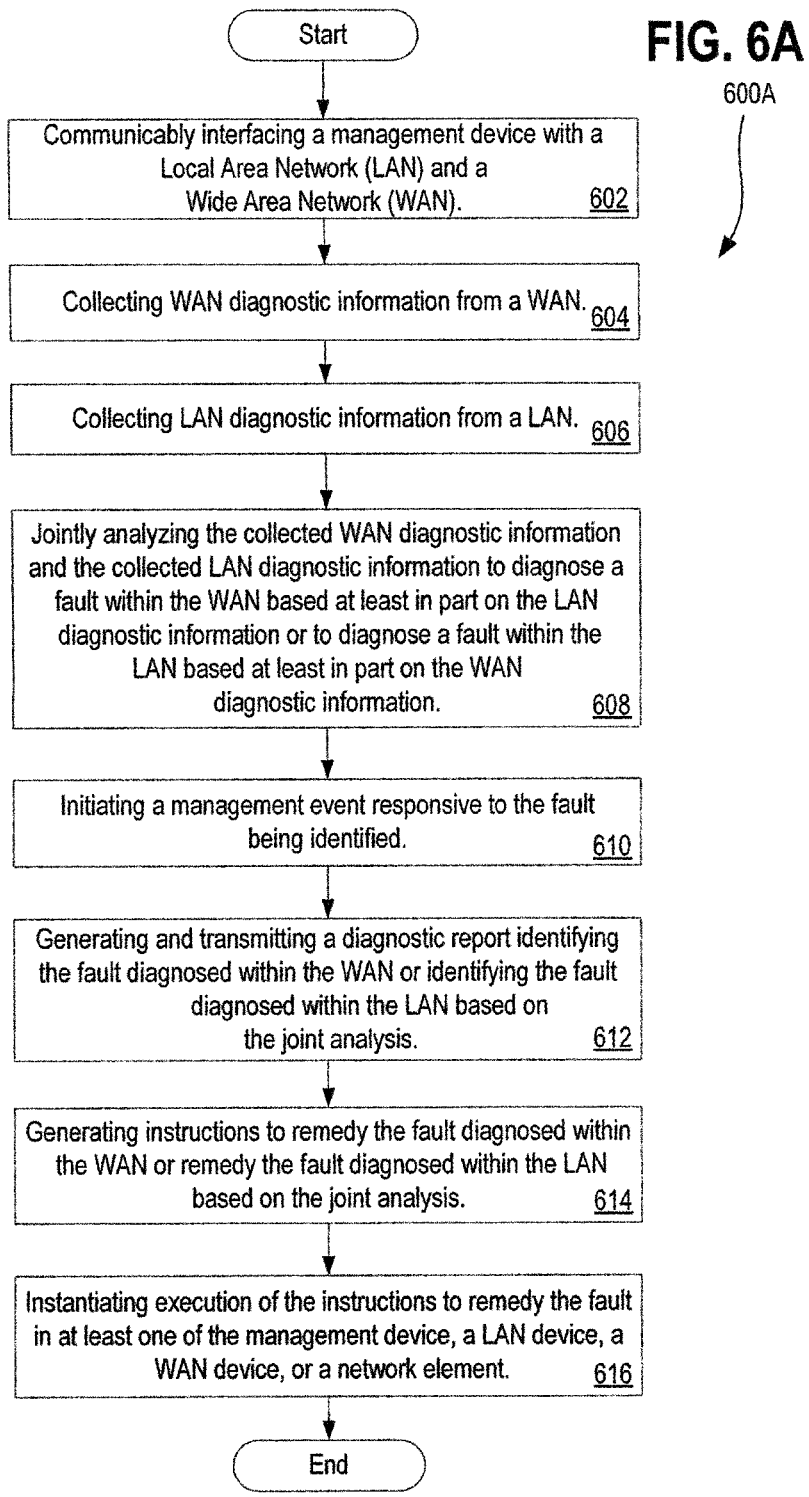

FIGS. 6A, 6B, and 6C are flow diagrams illustrating methods for jointly optimizing WAN and LAN network communications in accordance with described embodiments. Methods 600A, 600B, and/or 600C may be performed by processing logic that may include hardware (e.g., circuitry, dedicated logic, programmable logic, microcode, etc.), software (e.g., instructions run on a processing device to perform various operations such as interfacing functions, collecting, monitoring, diagnosing and reporting information, and executing/imitating management events, commands and instructions responsive to analysis and diagnosis, or some combination thereof. In one embodiment, methods 600A, 600B, and 600C are performed by a Management device such as that depicted at element 170 of FIG. 1 or via a Management Device such as that depicted at element 501 of FIG. 5. Some of the blocks and/or operations listed below are optional in accordance with certain embodiments. The numbering of the blocks presented is for the sake of clarity and is not intended to prescribe an order of operations in which the various blocks must occur.

Method 600A begins with processing logic for communicably interfacing a management device with a Local Area Network (LAN) and a Wide Area Network (WAN) as set forth at block 602. At block 604, processing logic collects WAN diagnostic information from a WAN and at block 606, processing logic collects LAN diagnostic information from a LAN.

At block 608, processing logic jointly analyzes the collected WAN diagnostic information and the collected LAN diagnostic information to diagnose a fault within the WAN based at least in part on the LAN diagnostic information or to diagnose a fault within the LAN based at least in part on the WAN diagnostic information.

At block 610, processing logic initiates a management event responsive to the fault being identified. Initiating a management event may include performing one or more various functions including: generating and transmitting a diagnostic report identifying the fault diagnosed within the WAN or identifying the fault diagnosed within the LAN based on the joint analysis as set forth at block 612; generating instructions to remedy the fault diagnosed within the WAN or to remedy the fault diagnosed within the LAN based on the joint analysis as set forth at block 614; and instantiating execution of the instructions to remedy the fault in at least one of the management device, a LAN device connected via the LAN interface, a WAN device connected via the WAN interface, or a network element connected to the management device via a management interface (block 616).

Method 600B begins with processing logic at block 630 communicably interfacing the management device with a Local Area Network (LAN) and a Wide Area Network (WAN).

At block 632, processing logic collects WAN information from the WAN and LAN information from the LAN. At block 634, processing logic jointly analyzes the collected WAN information and the collected LAN information to identify an operational condition and at block 636, processing logic initiates a management event responsive to the operational condition being identified.

Initiating a management event may include performing one or more various functions including: Generating and transmitting an operational report describing the operational configuration of a communication channel related to the WAN and the LAN based on the joint analysis as set forth at block 638; storing collected WAN information as historical WAN information and storing collected LAN information as historical LAN information as set forth at block 640; performing historical performance trending analysis based on stored historical WAN information and stored historical LAN information as set forth at block 642; and generating and transmitting a historical performance trending report describing the historical operational performance of a communication channel related to the WAN and the LAN as set forth at block 644.

At block 646, processing logic initiates a management event responsive to analysis of the stored historical WAN information or responsive to analysis of the stored historical LAN information, or responsive to analysis of both.

Method 600C begins with processing logic at block 660 communicatively interfacing the management device with a Local Area Network (LAN) and a Wide Area Network (WAN). At block 662, processing logic collects WAN information from the WAN and LAN information from the LAN. At block 664, processing logic jointly analyzes the collected WAN information and the collected LAN information to identify an operational condition and at block 666, processing logic initiates a management event responsive to the operational condition being identified.

Initiating a management event may include performing one or more various functions including: generating and executing commands against a LAN device to change the configuration of the LAN device commands based on the joint analysis as set forth at block 668; and/or generating and sending a request to a WAN operator triggering the WAN operator to implement a requested configuration change based on the joint analysis as set forth at block 670.

At block 672, processing logic collects neighborhood information that is not yet analyzed from one or more WANs, from one or more LANs, or from a combination of WANs and LANs. Such information may be collected and subsequently aggregated and/or analyzed by a management device to generate neighborhood analysis.

At block 674, processing logic collects neighborhood analysis from a WAN having aggregated LAN information or LAN information corresponding to multiple separate and distinct LANs; and at block 676, processing logic initiates a management event responsive to analysis of the neighborhood analysis.

FIG. 7 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected (e.g., networked) to other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing database storage services. Certain embodiments of the machine may be in the form of a personal computer (PC), a tablet PC, a set top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and persistent data base implementations), which communicate with each other via a bus 730. Main memory 704 includes information and instructions and software program components necessary for performing and executing the functions with respect to the various embodiments of the Management Device as described herein. For example, historical WAN/LAN information 724 may include previously collected LAN information from a LAN and WAN information from a LAN which may be collected over a period of time and referenced later for performing trending analysis. Management events 723 may be stored within main memory 704 and triggered or initiated responsive to analysis of LAN and/or WAN information collected by management device 734. Main memory 704 and its sub-elements (e.g. 723 and 724) are operable in conjunction with processing logic 726 and/or software 722 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include one or more network interface cards 708 to communicatively interface the computer system 700 with one or more networks 720 from which information may be collected for analysis. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.). The computer system 700 may perform the functions of a Management Device 734 capable interfacing networks, monitoring, collecting, analyzing, and reporting information, and initiating, triggering, and executing various management events including the execution of commands and instructions to alter an identified operational condition or perform corrective measures on a diagnosed fault, as well as the various other functions and operations described herein.

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may also reside, or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A management device, comprising:
   a Local Area Network (LAN) interface to communicably interface the management device with a LAN;
   a Wide Area Network (WAN) interface to communicably interface the management device with a WAN, wherein the WAN is to provide broadband connectivity to the LAN through a Digital Subscription Line (DSL) connection;
   a collection logic to collect LAN information from one or more communication layers on the LAN and WAN information from one or more communication layers on the WAN; and
   an analysis logic to jointly analyze the collected WAN information and the collected LAN information to identify an operational condition, the operational condition is within the LAN in a different communication layer from the one or more communication layers on the WAN, identified based at least on collected WAN information or within the WAN in a different communication layer from the one or more communication layers on the LAN, identified based at least on collected LAN information.

2. The management device of claim 1 comprises: an implementation logic to initiate a management event responsive to the operational condition being identified.

3. The management device of claim 2 comprises a diagnostics logic to jointly analyze the collected WAN information and the collected LAN information to diagnose a fault within the WAN based at least in part on the LAN information or to diagnose a fault within the LAN based at least in part on the WAN information.

4. The management device of claim 3, wherein the implementation logic is to initiate a management event responsive to the fault being identified.

5. The management device of claim 1, wherein the WAN information collected from the WAN comprises information specific to a second communication layer of the WAN, different than a first communication layer of the LAN.

6. The management device of claim 1, wherein the operational condition identified based on the joint analysis comprises at least one of: network congestion within the WAN; network congestion within the LAN; excess power consumption by communication elements within the LAN; excess power consumption by communication elements within the WAN; bandwidth utilization of the WAN in excess of a maximum threshold; bandwidth availability of the WAN below a minimum threshold; a security breach within the LAN; or a network intrusion within the LAN.

7. The management device of claim 1, wherein the collection logic is to collect the WAN information and the LAN information from one or more sources including:
   a Digital Subscriber Line (DSL) Customer Premises Equipment (CPE) modem;
   an in-home powerline device;
   a Home Phoneline Network Alliance (HPNA) based device;
   an in-home coax distribution device;
   a G.hn (Global Home Networking Standard) compatible device;
   an in-home metering communication device;
   an in-home appliance communicatively interfaced with the LAN;
   a wireless femtocell base station;
   a wireless WiFi compatible base station;
   a wireless mobile device repeater;
   a wireless mobile device base station;
   a set-top box (STB)/set-top unit (STU) customer electronics device;
   an Internet Protocol (IP) enabled television;
   an IP enabled media player;
   an IP enabled gaming console;
   an Ethernet gateway;
   a computing device connected to the LAN;
   an Ethernet connected computer peripheral device;
   an Ethernet connected router;
   an Ethernet connected wireless bridge;
   an Ethernet connected network bridge; or
   an Ethernet connected network switch.

8. The management device of claim 1 comprises a Digital Subscriber Line (DSL) modem operating as a Customer Premises Equipment (CPE) device to communicatively interface a DSL based backhaul provided via the WAN to the LAN.

9. The management device of claim 1 comprises a cable modem operating to communicatively interface a cable network based backhaul provided via the WAN to the LAN.

10. The management device of claim 1 comprises a wireless modem operating to communicatively interface a wireless based backhaul provided via the WAN to the LAN.

11. The management device of claim 1 comprises a powerline modem operating to communicatively interface a powerline based backhaul provided via the WAN to the LAN.

12. The management device of claim 1 comprises an Optical Network Terminal (ONT) operating to communicatively interface a fiber optic based backhaul provided via the WAN to the LAN.

13. The management device of claim 1 comprises a router operating to communicatively interface a WAN connected backhaul to the LAN.

14. The management device of claim 1 comprises a computing device remotely located from a WAN/LAN interface through which a communication channel related to the WAN and the LAN is connected, wherein the computing device is to provide remote monitoring and management functionality for the WAN/LAN interface.

15. A method comprising:
coupling a Local Area Network (LAN) interface to a management device with a LAN;
coupling a Wide Area Network (WAN) interface to the management device with a WAN, wherein the WAN is to provide broadband connectivity to the LAN through a Digital Subscription Line (DSL) connection;
collecting LAN information from one or more communication layers on the LAN and WAN information from one or more communication layers on the WAN; and
analyzing jointly the collected WAN information and the collected LAN information to identify an operational condition, the operational condition is within the LAN in a different communication layer from the one or more communication layers on the WAN identified based at least on collected WAN information or within the WAN in a different communication layer from the one or more communication layers on the LAN identified based at least on collected LAN information.

16. The method of claim 15 comprises diagnosing a fault within the WAN or the LAN based on the operational condition identified.

17. The method of claim 15 comprises initiating a management event responsive to the operational condition being identified.

18. The method of claim 15, wherein the WAN information collected from the WAN comprises information specific to a second communication layer of the WAN, different than a first communication layer of the LAN.

19. A non-transitory machine-readable storage media having machine readable instructions that when executed by a processor in a management device, cause the management device to perform a method comprising:
coupling a Local Area Network (LAN) interface to the management device with a LAN;
coupling a Wide Area Network (WAN) interface to the management device with a WAN, wherein the WAN is to provide broadband connectivity to the LAN through a Digital Subscription Line (DSL) connection;
collecting LAN information from one or more communication layers on the LAN and WAN information from one or more communication layers on the WAN; and
analyzing jointly the collected WAN information and the collected LAN information to identify an operational condition, the operational condition is within the LAN in a different communication layer from the one or more communication layers on the WAN identified based at least on collected WAN information or within the WAN in a different communication layer from the one or more communication layers on the LAN identified based at least on collected LAN information.

20. The non-transitory machine-readable storage media of claim 19 having further machine readable instructions that when executed cause the process to perform an operation which comprises diagnosing a fault within the WAN or the LAN based on the operational condition identified.

* * * * *